(12) United States Patent
Zimmer et al.

(10) Patent No.: US 7,051,843 B2
(45) Date of Patent: May 30, 2006

(54) FRICTION BRAKE ARRANGEMENT WITH ENERGIZING BRAKING FUNCTION

(76) Inventors: Günther Zimmer, Im Salmenkopf 7, 77866 Rheinau (DE); Martin Zimmer, Mohlenstrasse 6, 77866 Rheinau (DE)

( * ) Notice: Subject to any disclaimer, the term of this patent is extended or adjusted under 35 U.S.C. 154(b) by 0 days.

(21) Appl. No.: 11/127,517

(22) Filed: May 12, 2005

(65) Prior Publication Data

US 2005/0199451 A1     Sep. 15, 2005

Related U.S. Application Data

(63) Continuation-in-part of application No. PCT/DE03/03752, filed on Nov. 12, 2003.

(30) Foreign Application Priority Data

Nov. 12, 2002   (DE) ................................ 102 52 915

(51) Int. Cl.
   *B65H 59/10*    (2006.01)

(52) U.S. Cl. ........................................................ 188/67

(58) Field of Classification Search ................... 29/721; 74/89.14–89.23; 192/143–144; 188/67
    See application file for complete search history.

(56) References Cited

U.S. PATENT DOCUMENTS

| | | | | |
|---|---|---|---|---|
| 5,950,773 | A * | 9/1999 | Ito ................................ | 188/67 |
| 6,009,981 | A * | 1/2000 | Wolfe .......................... | 188/267 |
| 6,186,047 | B1 * | 2/2001 | Baruffaldi ...................... | 92/24 |
| 6,446,769 | B1 * | 9/2002 | Kangiser et al. ............. | 188/171 |
| 6,460,678 | B1 * | 10/2002 | Henk et al. ................... | 192/143 |
| 2002/0112929 | A1 * | 8/2002 | Koshak ......................... | 188/67 |
| 2003/0062227 | A1 * | 4/2003 | Kato et al. ..................... | 188/67 |
| 2003/0094334 | A1 * | 5/2003 | Hsu et al. ...................... | 188/67 |
| 2004/0099492 | A1 * | 5/2004 | Onuki et al. ................. | 188/163 |

FOREIGN PATENT DOCUMENTS

JP             10112971       *   4/1998

* cited by examiner

*Primary Examiner*—Chris Schwartz
(74) *Attorney, Agent, or Firm*—Klaus J. Bach

(57) ABSTRACT

In a friction brake arrangement with emergency braking functions for use with a carriage supported on a guide track, with a friction clamping structure including a friction shoe supported in a housing so as to be disposed adjacent the guide track, a spring element is provided biasing the friction shoe toward the guide track for frictional engagement therewith and also a power operated drive for disengaging the friction shoe from the guide track against the force of the spring element and, furthermore, a blocking member is disposed between the drive means and the spring element and held electromagnetically in the blocking position so that the spring is released and the carriage is locked to the guide track for example upon occurrence of a power outage.

9 Claims, 9 Drawing Sheets

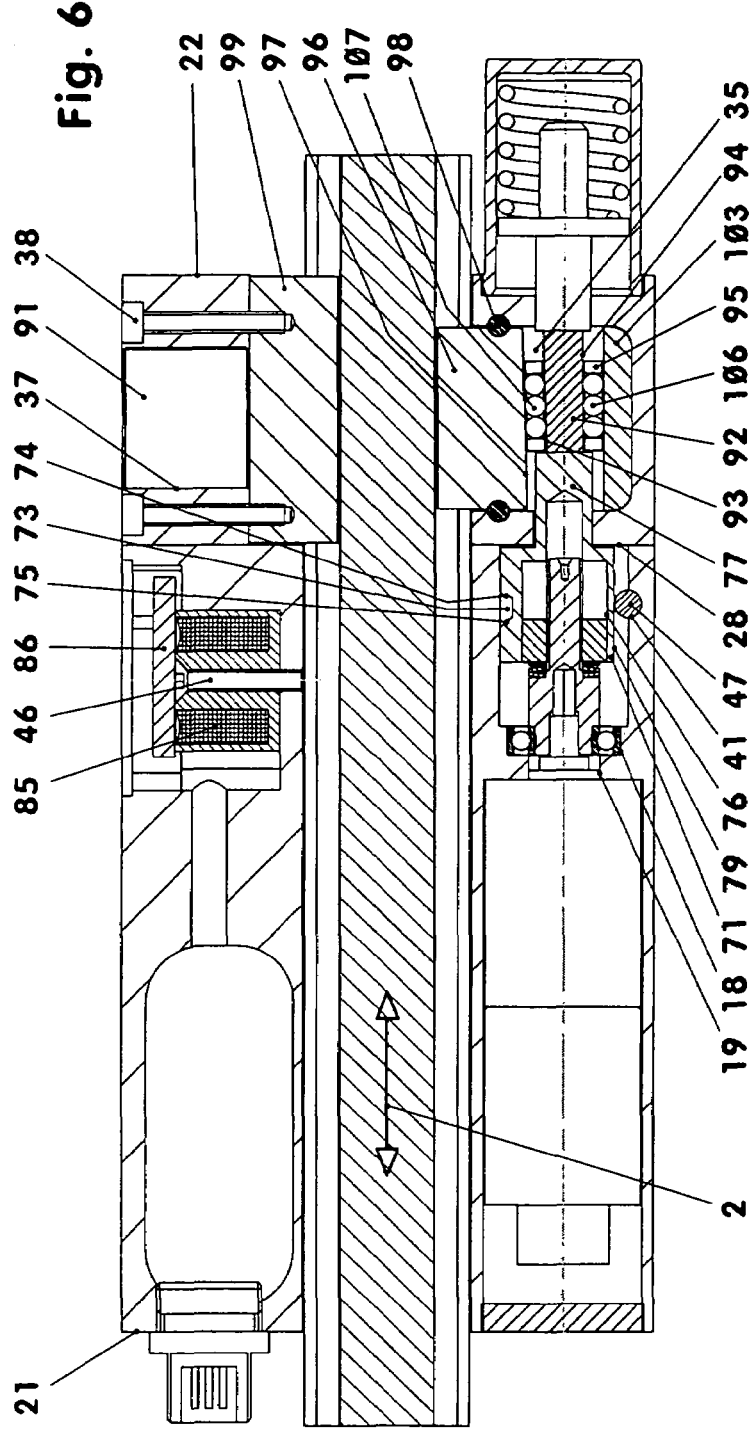
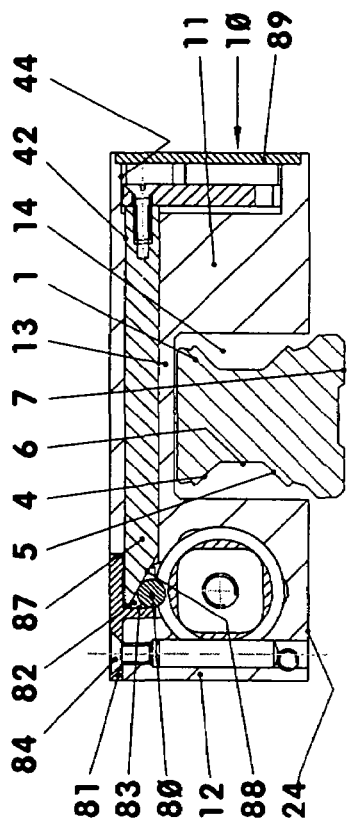

Fig. 12
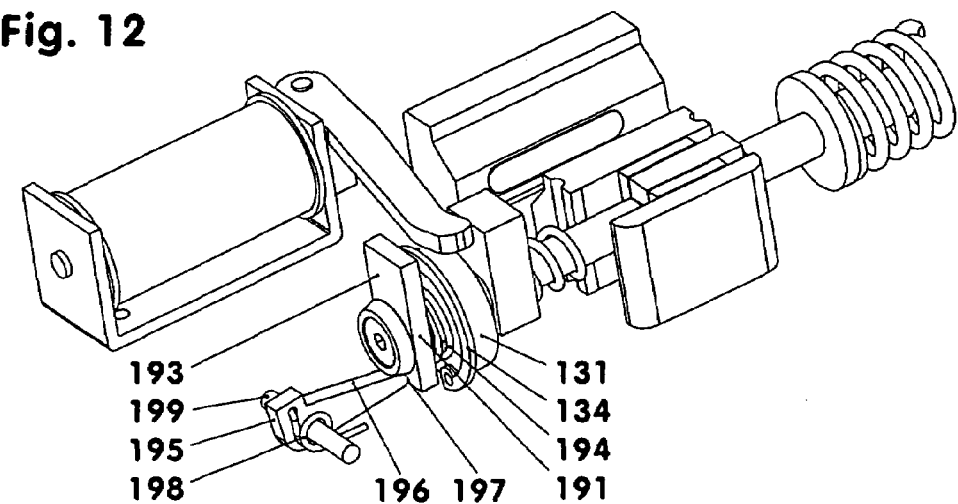
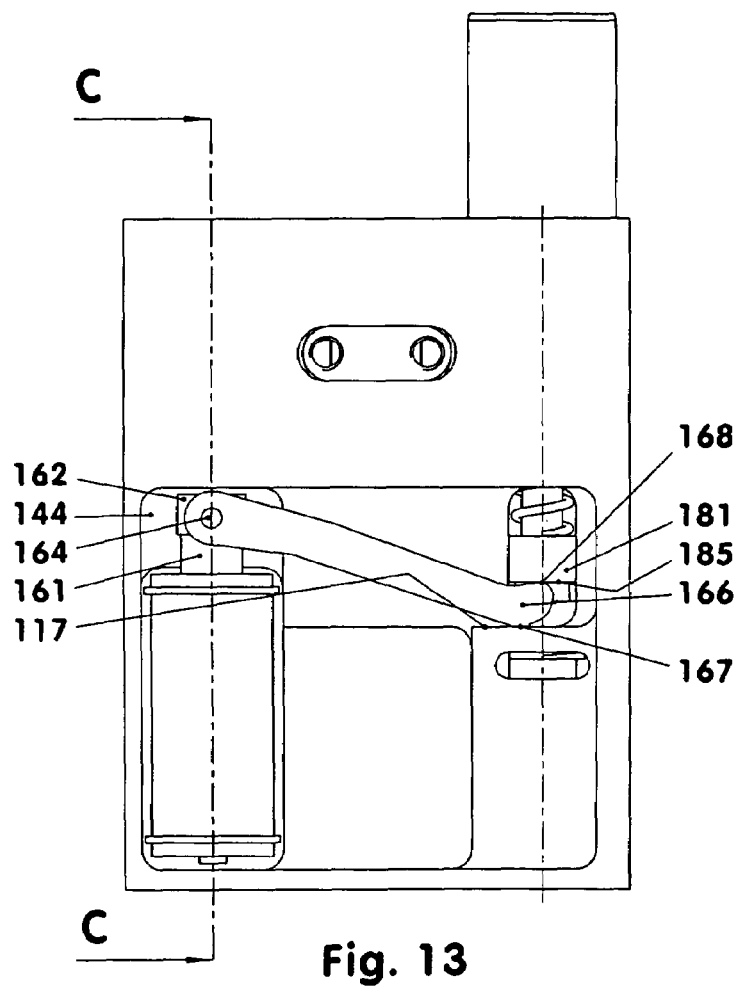
Fig. 13
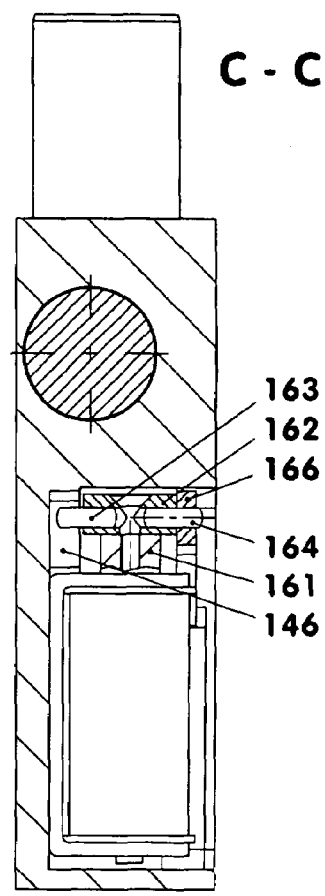
Fig. 14

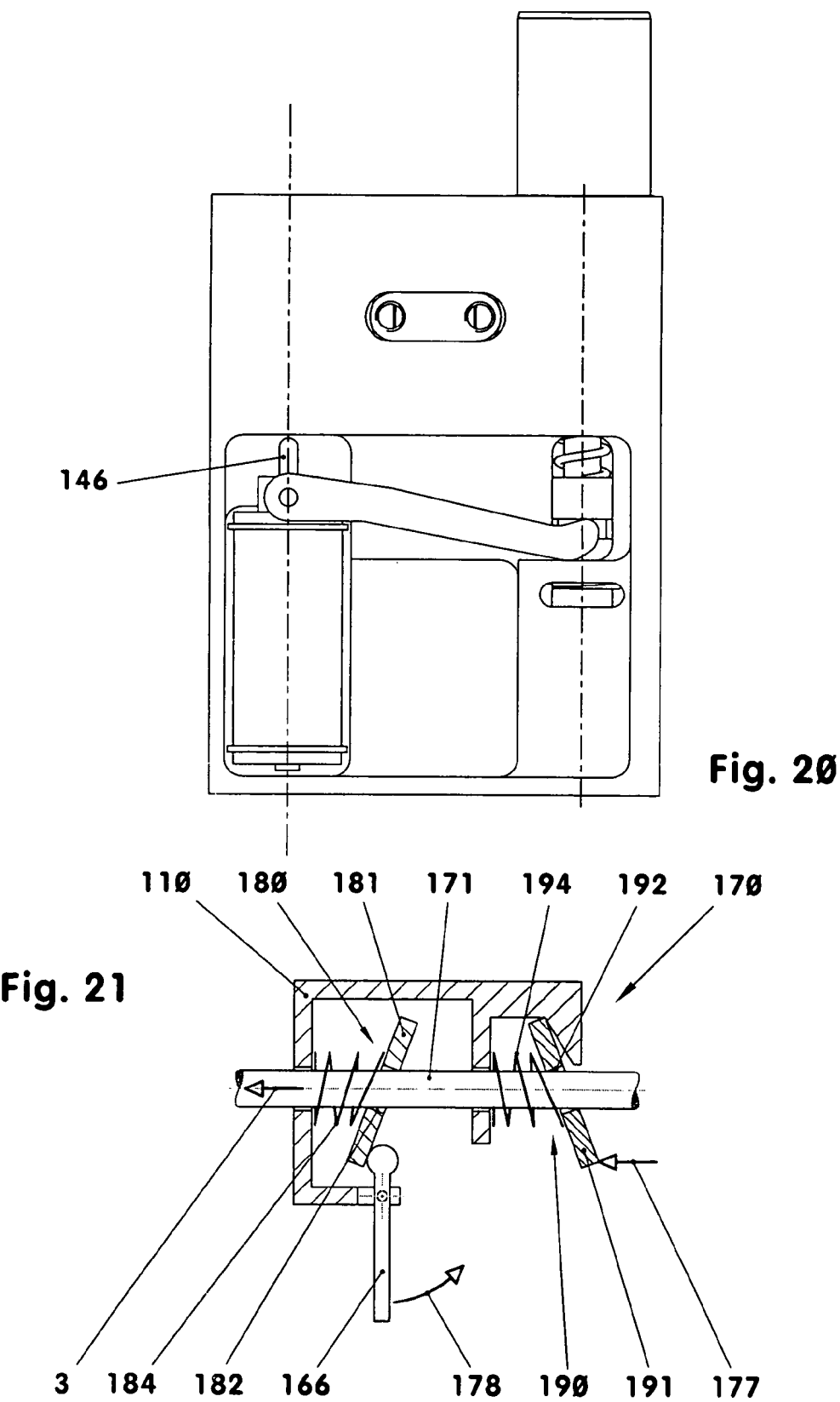

FRICTION BRAKE ARRANGEMENT WITH ENERGIZING BRAKING FUNCTION

This is a Continuation-In-Part Application of International Application PCT/DE03/03752 filed Nov. 12, 2003 and claiming the priority of German application 102 52 915.9 filed Nov. 12, 2002.

BACKGROUND OF THE INVENTION

The invention relates to a friction clamping and/or emergency braking arrangement for mounting to a carriage guided in at least one guide track wherein the arrangement comprises at least one friction retaining structure with at least one friction shoe supported in the housing so that it can be pressed into engagement with the guide track, wherein the friction braking arrangement is movable by the force of a spring in one direction and, for a release by a force generated by a pneumatic, hydraulic, electromagnetic, electromechanical or piezoelectric drive means, is movable in the opposite direction.

From the brochure "MK/BW/TK/KW/HK/AU Clamping and Brake Elements for Linear Guide Arrangements" of the company Zimmer GmbH, Rheinau-Freistett, published in January 2001 a brake and/or clamping arrangement with a slide wedge drive effective in two ways is described (see pages 24 and 25). In this arrangement, a spring force storage structure which can be pre-tensioned by a pneumatic drive means is used for the gas-pressure-free clamping and braking. If, for example, the gas pressure drops as a result of a faulty operation, the pre-tensioned spring element of the spring energy storage structure is released for actuating the friction shoes. The gas volume to be displaced by the moving pneumatic components upon occurrence of such a fault prevents, by its throttling effect, an instant response of the braking structure.

In order to pretension the spring storage device, a commercially available motor or a multi-clamping device may be used. A multi-clamping structure has been used for many years by Volkswagen in a vehicle jack. Today such clamping structure are available for example in building material supermarkets in connection with presses for cartridges filled with cementing or sealing materials.

It is the object of the present invention to provide a clamping and/or emergency braking arrangement which has a large clamping force, requires little space and has a small mass and, upon a fault occurrence, is rapidly effective.

SUMMARY OF THE INVENTION

In a friction brake arrangement with emergency braking functions for use with a carriage supported on a guide track, with a friction clamping structure including a friction shoe supported in a housing so as to be disposed adjacent the guide track, a spring element is provided biasing the friction shoe toward the guide track for frictional engagement therewith and also a power operated drive for disengaging the friction shoe from the guide track against the force of the spring element and, furthermore, a blocking member is disposed between the drive means and the spring element and held electromagnetically in the blocking position so that the spring is released and the carriage is locked to the guide track for example upon occurrence of a power outage.

The friction clamping device is actuated by the release of energy stored in a spring energy storage structure which is transmitted to the friction shoes by way of the slide wedge drive.

The guide track which is engaged by the friction shoe may have a prismatic, rectangular, round, oval or polygonal cross-section. Also, the friction engagement arrangement is not limited to linear guide structures. Instead of straight guide tracks spatially curved guide tracks may be present.

In order to achieve short response times for example in an emergency situation, an engagement or locking structure may be disposed between the components acting on the friction shoe to generate the clamping force and the spring element of the spring force storage structure. The locking structure blocks the pretension in the spring storage structure so as to permit a rapid application of the spring force to the friction shoes during an emergency. For example, a ball effective as a locking structure may be arranged between the spring storage structure and the drive train to the friction clamping structure. The locking structure is held back for example electromagnetically, that is, by an electric motor or an electromagnet. Upon interruption of the power supply to the electromagnets holding the locking structure the locking structure is released—independent of the reason for the interruption of the power supply so that the suddenly released spring energy caused the engagement of the friction clamping structure with the guide track supporting the carriage thereby to brake the carriage.

An embodiment of the invention will be described below in greater detail on the basis of the schematic drawings enclosed herewith.

BRIEF DESCRIPTION OF THE DRAWINGS

FIG. 6 is a planar longitudinal cross-sectional view of the arrangement of FIG. 1 with the friction clamping structure deactivated;

FIG. 7 is a cross-sectional view transverse to that of FIG. 6;

FIG. 12 is a view like FIG. 11 with the spring pre-tensioned;

FIG. 13 is a top view of FIG. 10;

FIG. 14 is a sectional view taken along line C—C of FIG. 13 through the actuating magnet;

FIG. 20 shows schematically the arrangement for the clamping structure; and

FIG. 21 shows an operating arrangement for a clamping rod.

DESCRIPTION OF A PARTICULAR EMBODIMENT

The FIGS. 1 to 3, 6 to 9, and 10 to 20 show clamping and/or emergency brake arrangements as they are used in many horizontally and vertically movable carriages in tools and measuring devices. The arrangements presented herein are disposed on the respective carriages in such a way that their engagement structure extends around the guide tracks of the carriage guide and support structure.

Figure 1:
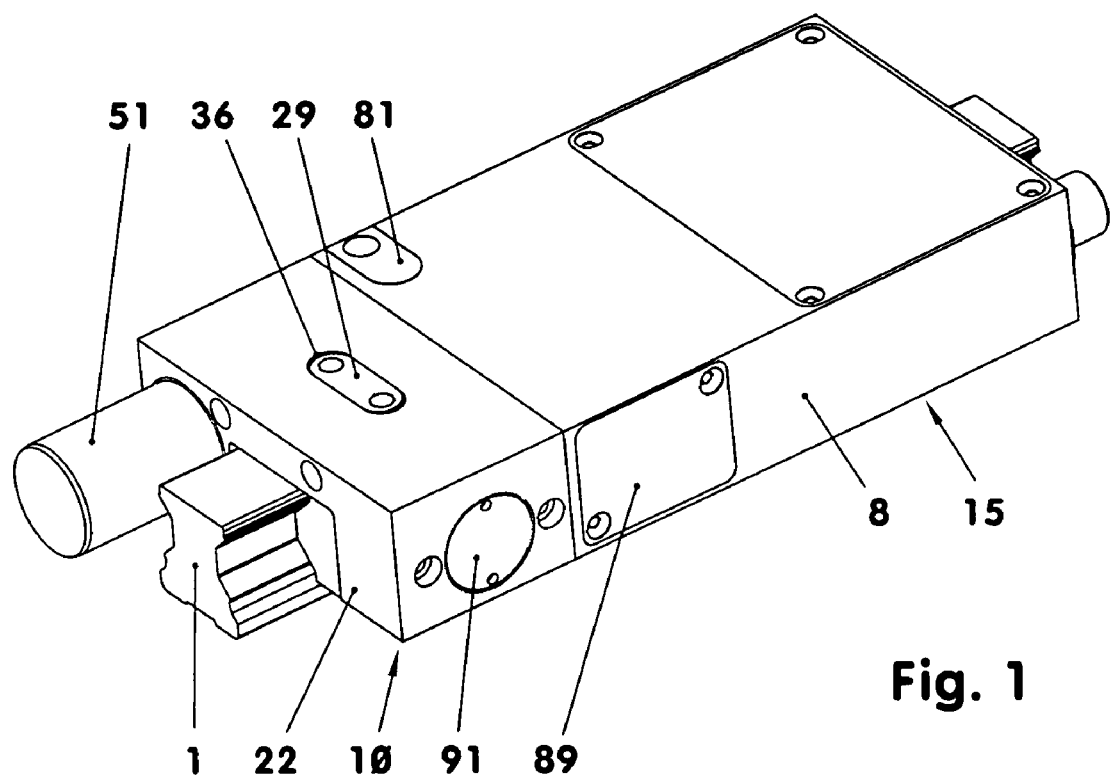
FIG. 1 shows a mounted friction clamping or emergency braking arrangement with an electric motor.
Figure 2:
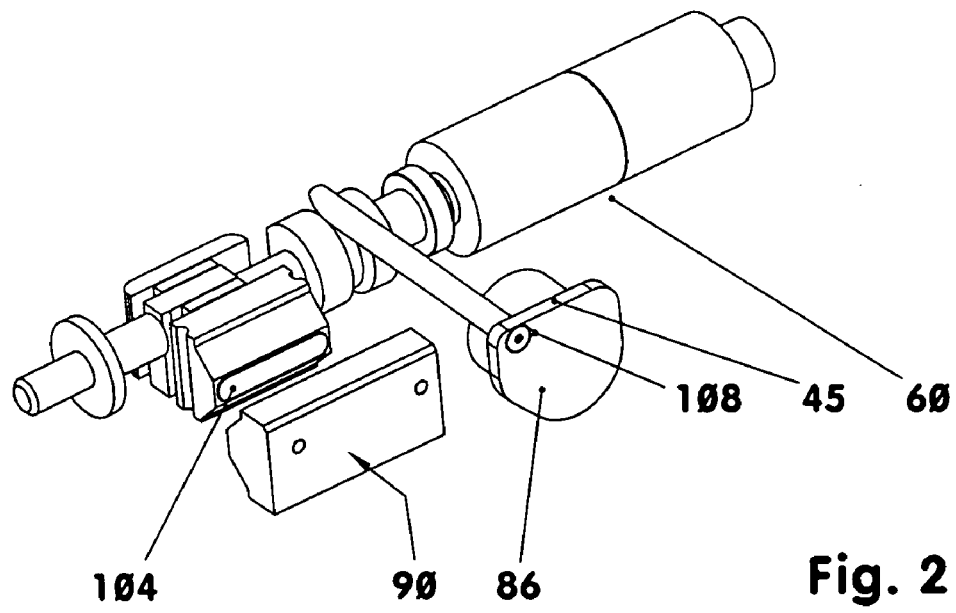
FIG. 2 shows the arrangement of FIG. 1 without the housing and without spring element.

FIGS. 1 and 7 show a section of a double-sided prismatic guide track 1. The guide track 1 consists of a rod of an essentially rectangular cross-section into which V-shaped widened grooves are formed at opposite sides of the track. The track is supported for example by way of its bottom surface 7 on a machine bed which is not shown.

On the inclined guide surfaces 4, 5 shown in FIG. 7 at opposite sides of the track 1 corresponding guide surfaces of the carriage are slidably supported directly or indirectly by way of non-friction bearings. Between every two guide surfaces 4, 5, there is an intermediate groove bottom area 6 which is engaged by the friction pads 109 of the friction clamping structure 90.

The guide track 1 is surrounded by a housing 10, 15 which comprises for example two parts. The housing consists of a clamping housing 10 and a drive housing 15. Both are arranged one after the other along the guide track 1 and have essentially the same cross-section and are rigidly connected to each other. A clamping and emergency braking forces generating structure is integrated into the clamping housing 10. The essentially C-shaped clamping housing 10 is in the form of a square block, see FIG. 7, which is provided with a groove 14 of rectangular cross-section and in which the guide track 1 is received. The width of the groove 14 exceeds the width of the guide track only by a few millimeters.

The groove depth is about 81% of the height of the guide track. The clamping housing 10 includes in its center above the guide track 1 an elongated recess 36 in which a guide member 29 is disposed with little clearance on the longitudinal direction and relatively large clearance or play in the transverse direction. The guide member 29 is form-fittingly received in the housing 10 and extends in a direction normal to a plane defined by the longitudinally and transversely extending plane. By its transverse movability in the recess 36, it can accommodate the one-sided clamping movement of the friction clamping structure 90. It is rigidly connected to the carriage which is movably supported on the guide track 1.

The housing 10, 15 has in accordance with FIG. 7, for example transverse to the guide direction 2, a width which is about three times the width of the guide track. The overall height of the housing 10, 15 is for example 120% of the guide track height. The length of the housing 10, 15—measured in the plane of FIG. 6—is for example, eight times the guide track height.

The housing 10, 15 has a right and a left housing zone 11, 12. Both zones 11, 12 are disposed below a flange zone 13. The clamping housing 10 is provided in the housing zone 11 with a transverse bore 37, which is finely threaded. Opposite this transverse bore 37, the housing zone 12 has an essentially rectangular recess 31 which extends from the bottom into the housing zone 12 and is open toward the guide groove 14. In the area of the bottom 24, it is closed by a lid 35. In accordance with FIG. 6, the clamping housing 10 includes two bores 32, 33 which extend co-axially and parallel to the longitudinal direction 2 of the guide track 1.

Figure 8:
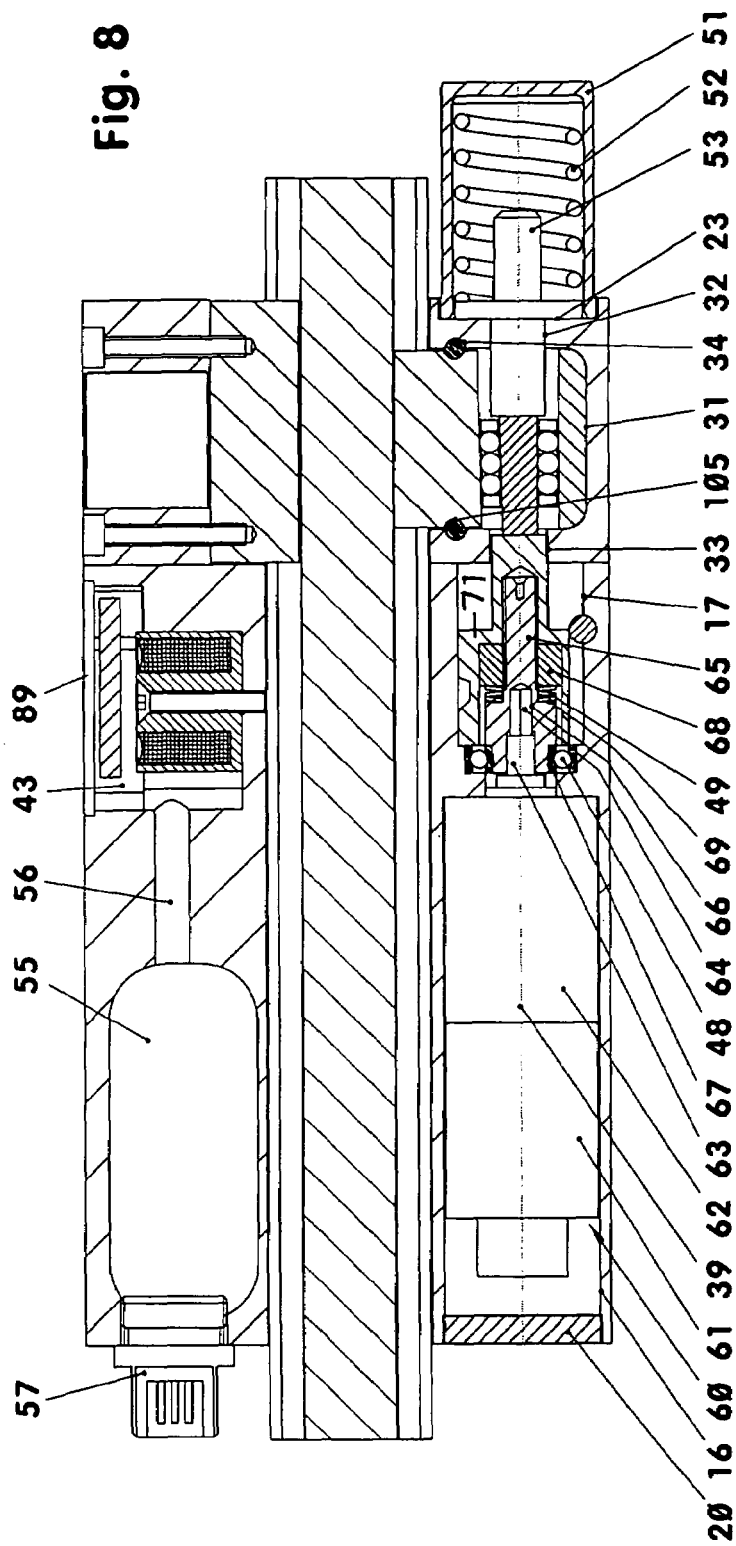
FIG. 8 is a planar longitudinal cross-sectional view as shown in FIG. 7 with the friction clamping structure activated.
Figure 9:
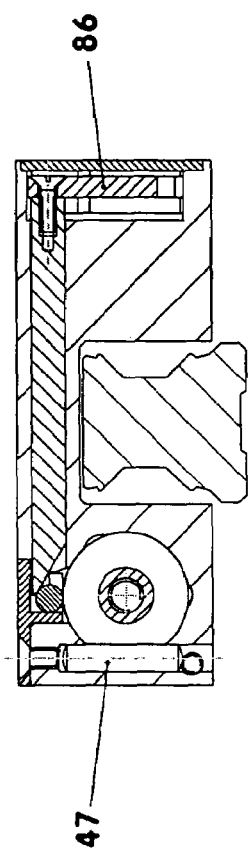
FIG. 9 is a cross-sectional view transverse to that of FIG. 8.

In the clamping structure recess 31, the slide wedge drive of the friction clamping structure 90 is arranged. The clamping structure 90 comprises essentially a slide wedge 92, two cages 95 with cylinder rollers 106, 107 a roller support plate 103 and a movable friction shoe 96. The slide wedge 92 which for the operation of the friction clamping structure 90 in accordance with FIGS. 9 and 8 is supported for example by a friction bearing, is moved to the right. As a result, it presses the friction shoe 96 against the guide track 1. The slide wedge 92 is a trapezoidal body of rectangular cross-section, see FIGS. 6 and 8. It is disposed with its front faces between the spring piston 53 and a clamping member 71. If expedient, it is mounted at one or both ends or attached to a member. The slide wedge 92 includes, among others, a support surface area 94 and a wedge surface area 93. Both surface areas are rectangular and planar. The wedge surface area 93 facing the pressure area 97 of the friction shoe 96 forms therewith an acute angle of for example 1 to 5°. The support surface area 94 extends parallel to the roll surface of the adjacent roll plate 103. For example, the cross-sectional area of the slide wedge 92 becomes linearly smaller with increasing distance from the spring piston 53. In the embodiment shown herein, the first quarter of the length of the slide wedge 92 is not tapered. Between the pressure area 97 of the friction shoe 96 and the wedge are 93 of the slide wedge 92 and also between the support surface 94 of the slide wedge 92 and the roll plate 103 cylindrical rollers 106 and 107 are disposed so as to support the slide wedge while rolling with ½ the speed of the slide wedge.

Figure 3:
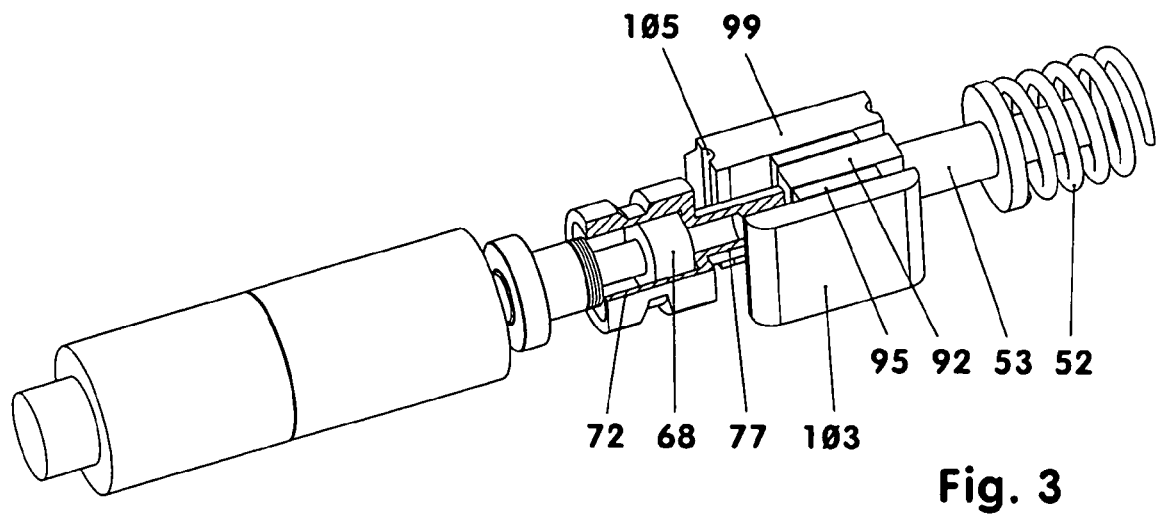
FIG. 3 shows in a partial sectional view, the spring tensioning drive and slide wedge drive.
Figure 4:
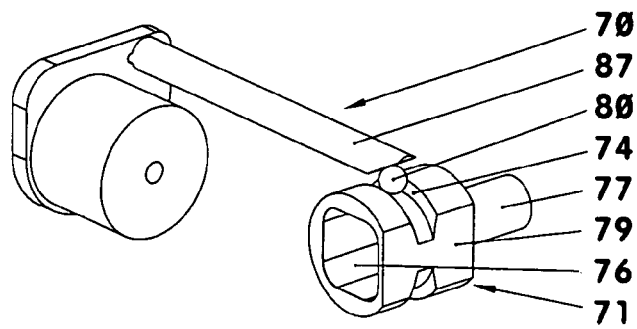
FIG. 4 shows parts of the locking structure.
Figure 5:
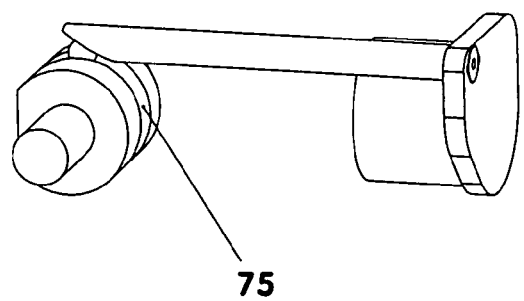
FIG. 5 shows the structure of FIG. 4 in a different view.

The recess 31 includes—in accordance with FIGS. 6 and 8—at least to the right and left of the friction shoe 96 a semicircular groove 34 disposed opposite semicircular grooves 105, see FIG. 3, in the friction shoe 96 when the friction clamping structure is not actuated. Between pairs of semicircular grooves 34, 105 elastomer elements 98 are disposed, which provide, among others, for a backing off of the friction shoe 96.

Opposite the friction shoe 96, a friction jaw 99 which is stationary with respect to the housing 10, 15 is provided in the housing zone 12. The stationary friction jaw 99 is supported on the clamping housing 10 via an adjustment screw 91 and is held in position by two screws 38. The adjustment screw 91 is disposed in the transverse bore 37 via a fine thread. It is a cylindrical disc provided at its outer front face with bores for engagement by a socket wrench. The fine thread ends for example in an annular groove in which expediently a locking ring is disposed for locking the adjustment screw 91 in its adjustment position.

The friction shoes 96 and friction jaws 99 are shown as prismatic bodies whose shapes correspond partially with the contour of the groove in the guide track 1. Each friction shoe or jaw 96, 99 is essentially an elongated rectangular body which is provided toward the guide track 1 in the area of the guide surfaces 4, 5 with a taper of 45°. The length of the friction shoe 96 corresponds, for example in the longitudinal direction 2—approximately to the length of the clamping housing 10 while the length of the friction shoe 96 is slightly less than that of the clamping structure recess 31.

A friction layer 104 is for example pressed into the outer surface facing the web area 6 of the guide track 1 (see FIG.

2). To this end, the friction shoe or jaw 96, 99 includes a recess whose depth is for example four times the length by which the friction layer projects from the surrounding surface area. The friction layer projects for example 0.5 mm. The recess is of rectangular shape with rounded corners. The width is slightly less than the height of the web area 6.

For the friction layer 104 a powder-metallurgically manufactured friction material on bronze basis is used. The friction material additionally contains ceramic components. The friction layer 104 is pressed into the recess 101. It may also be cemented or soldered to the side walls of the recess.

The friction layer may also comprise several round or angled or polygonal friction layers which are disposed in corresponding recesses in the friction jaw or shoe.

As shown in FIGS. 6 and 8 on the right next to the slide wedge drive for the friction clamping structure at the housing zone 12, there is a cylindrical recess 23 with a fine thread. Onto the fine thread of this recess 23, a spring housing 51 is threaded. The spring housing 51 is a thin-walled cylindrical can with planar bottom wall on which at least one spring element is supported which acts pre-tensioned on the piston bottom side of the spring piston 53. In FIGS. 3, 6, and 8, spiral compression springs 52 are indicated as the spring elements. If desired, an additional spring may be arranged in the interior of the spring element possibly with an opposite pitch. In place of the spring element 52, a plate spring column may be provided for forming the spring storage device, a plate spring packet or a combination thereof may be used.

In the fine thread area of the recess 23, there is also a groove in which a locking compression ring is disposed. It may also include vent openings which extends parallel to the center line 39.

On the other side of the housing zone 12 of the clamping housing 10 a multistage housing bore 16–19 is drilled in the drive housing 15. Its centerline extends for example co-axially with the center line 39 of the housing. Starting from the front area 21, the housing bore 16–19 comprises of a section for receiving the drive 60 that is the drive bore 16 which ends toward the front area 21 in a short threaded section for mounting a lid 20. In the area of the housing center, the bore 16 converges to a narrower centering seat, the planar transition area between the bore 16 and the center seat 14 serves as a mounting flange for mounting the drive 60 by means of screws which are not shown in the drawings.

Adjacent the centering seat 19, there is a bearing seat 18 and a locking bore 17. The diameter of the locking bore 17 is about ⅔ of the height of the guide track 1. The diameter of the bearing seat 18 is for example smaller than the diameter of the locking bore 17 and larger than the centering seat 19.

In the drive housing 15, there is furthermore a bore 41 which intersects the locking bore 17 tangentially. It is oriented normally to the bottom area 24 and—in the longitudinal direction of the bore—is disposed in the center area of the locking bore 17. The center line is a tangent to the wall of the locking bore 17.

In the locking bore 17, a locking member 71 is arranged. The locking member 71 is a bolt with two steps which comprises a guide body 72 and a co-axial push bolt 77. The larger guide body 72 has a hollow cylindrical surface on which the locking member 71 is supported in the locking bore 17. Within the hollow cylindrical cover, there is for example a central ball channel 73 in the form of an annular groove or a profiled straight line groove. In addition, the cylinder surface is flattened parallel to the center line of the cylinder or parallel to the side wall 8. The depth of the flattened area corresponds about to halve the diameter of the bore 41. In the bore 41 is a guide bolt 47 for example a cylindrical pin which abuts the surface of the flattened area 79 to prevent the locking member 71 from rotating. The guide bolt 47 and the bore 41 may be inclined in the plane formed by the flattening to obtain a larger support area.

In the guide body 72, there is a cavity 76 in which a screw jack nut 68 is disposed. The screw jack nut 68 has a square cross-section with rounded corners fitted into the cavity 76 for preventing relative rotation thereof. The cavity 76 whose depth is about three times the width of the nut 68 has a slightly larger or comparable cross-section. The nut 68 and the nut cavity 76 may be triangular or polygonal cross-sections or serrated or, respectively grooved shaft cross-section.

The cylindrical push bolt 77 extends through the blocking member bore 33 into the clamping structure recess 31 and there abuts the slide wedge 92.

The nut 68 is disposed on a stepped threaded shaft 65. The threaded shaft 65 extends into a stepped bore 66 in the drive shaft 63 of the drive 60 in a form fitting manner. To this end, the drive shaft 63 has at its front a hexagonal profile 64. In the area of the bore 66, the threaded rod 65 has about three times the diameter of the threaded area thereof. In the area of the front face facing the drive 60, it has a bearing seat 67. Between the bearing seal 67 and the bearing seat 18 of the housing bore (16–19) a groove ball bearing 48 is arranged.

Between the shaft rim 69 and the threaded shaft nut 68, a plate spring packet 49 is disposed on the drive shaft 63.

The drive 60 comprises a multi-stage transmission 62, which is arranged between the electric motor 61 integrated into the drive 60 and the drive shaft 63. The electric motor 61 may be provided with a tachometer generator.

In accordance with the FIGS. 7 and 9 in the drive housing 15 above the locking member 71, there is a ball housing 81 which is mounted by means of a screw 84. The ball housing contains an elongated ball guide structure 82, which is open toward the center of the housing. The elongated ball guide structure 82 in which a blocking ball is supported ends above the locking member 71 in a semi-cylindrical stop 83. It has a width which is slightly larger than the diameter of the blocking ball 80. The elongated spring 82 is so positioned that the blocking ball 80 abutting the stop 83 is arranged about in the center above the ball channel 73 of the blocking member 71 when in a blocking position. Following the end of the ball guide structure 82 which is open at the side toward the housing center, there is a guide bore 42 which extends in a direction transverse to the longitudinal direction 2 and in which a blocking bolt 87 is disposed. The blocking bolt 87 ends in an other housing zone 11 at an anchor plate 86 which is disposed in front of and electromagnet 85. The electromagnet 85 ends in the other housing zone 11 at an annular plate 86 disposed in front of an electromagnet 85. The electromagnet 85 and the anchor plate 86 are disposed in the housing zone 11 in a drive cavity 43 which can be closed by a rectangular side cover 89, see FIGS. 1, 2, 4, and 5.

In the drive cavity 43, the electromagnet 85 is mounted to the drive housing 15 by means of a central screw 46. The armature plate 86 is arranged in a space present between the electromagnet 85 and the side cover 89. The height of this space corresponds to the sum of the armature plate thickness and the blocking bolt stroke. For example, the planar armature plate 86 on which the blocking bolt 87 is mounted so as to extend normally therefrom has an engagement edge or surface area 45 which is suitable to prevent rotation, see FIG. 2. Here, the engagement surface area 45 extends parallel to the bottom area 24 and contacts the upper wall 44 of the drive cavity 43, see FIG. 7. The blocking bolt 87 has at its free end in the housing zone 12 a tapered front surface area, which has the function of a blocking wedge surface 88. The blocking bolt 87 is so oriented in the housing 15 that the normal of the blocking wedge surface 88 points into the direction of the blocking member 71 and is disposed in a plane which extends normal to the longitudinal direction 2. The blocking wedge surface 88 extends at an angle of for example 30° with regard to the bottom of the arrangement.

In order to secure the position of the locking wedge surface 88 with regard to the armature plate 86, the locking bolt 87 is secured in the mounting area for example by means of at least one slot pin 108. The locking bolt 87 may also be secured in the mounting area by other profile structures which engage the armature plate in a form-locking way.

In the drive housing 15, a hollow space 5 is provided next to the drive cavity 43, see FIG. 6 or 8, which is in communication with the drive cavity 43 by way of a cable bore 56. Toward the left end face 21, there is an opening in which a cable connector 57 is screwed. The hollow space 55, which is in communication with the drive cavity in the other housing zone 12 via a channel which is not shown, is provided for the accommodation of an electronic control unit.

During normal operation of the carriage provided with the arrangement according to the invention, the friction shoes and jaws 96, 99 do not abut the guide track 1: The friction clamping structure 90 is not activated when the spring of the spring storage structure is pre-tensioned.

In order to pretension, the spring 52 in the spring storage structure 51–53, the locking member 71 is moved from the position shown in FIG. 8 to the position as shown in FIG. 6. To do this, the motor drive screw jack rod 65 moves the screw jack nut 68 to the right. The screw jack unit in the process moves the locking member toward the face area 28 of the clamping housing 10. For example, by the increase of the motor torque or end switches or other sensors or sensor systems, energization of the motor is interrupted when the locking member has reached the face 28. A plate spring may be provided between the face wall 28 and the right front face of the guide body 72 to avoid excessive stresses to the motor.

When the face wall 28 has been contacted, the spring element 52 is pre-tensioned to the maximum extent and the ball channel 73 of the guide body 72 is disposed directly below the ball guide structure 82 of the ball housing 81. The locking ball 80 then falls into the ball channel 73 where it comes into contact with the channel edges 74, 75 see FIGS. 4, 5. The spring-side channel edge 74 forms with a line extending normal to the center line 39 at an angle of 0 to 30°. In the example, a 20° angle is provided whereas the angle of the channel flank 75 is for example 40°.

The locking ball 80 is fixed by the locking wedge surface area 88 in the ball channel 73 by energization of the electromagnet 85 and the advancement of the blocking bolt 87 toward the locking ball 80. As a result, the locking member is blocked in the locking bore 17. Now the drive 60 moves the screw jack unit 68 back to the position shown in FIG. 6 by reverse rotation of the driven threaded shaft 65. As soon as the screw jack nut 68 reaches the plate spring packet 49 the motor torque raises suddenly and the electric motor is de-energized. Now the clamping and emergency braking arrangement is ready for normal operation.

During an emergency operation and during a power outage, the clamping and emergency braking arrangement unit rapidly and safely brake and lock the carriage in position.

Upon interruption of the power supply to the electromagnet 85, the spring-loaded piston 53 moves by means of the slide wedge 92 the blocking ball 80 via the channel flank 74 out of the ball channel 73 into the ball guide structure 82. The locking bolt 87 is moved back together with the armature plate 86, as the armature plate 86 is released from the electromagnet 85.

In the area of the clamping structure recess 31, the surfaces 93, 94 come, with increasing slide wedge stroke, into contact with the cylinder rollers 106, 107 guided in the cages 95. The outer cylinder roller 106 supports the slide wedge 92 on the roll plate 103 while the inner cylinder rollers 107 push the friction shoe 96 against the resistance of the return elements 98 toward the guide track 1 and the friction jaw 99. The cylinder rollers 106, 107 now roll between the components 103, 92, 96 until force equilibrium has been reached between the spring force of the housing 10 and the spring force of the spring element 52. Then the friction clamping structure 90 has reached maximum clamping force. The friction shoe and jaw 96, 99 are in engagement via the friction pads 104, with the web areas 6 of the guide track 1. The elastomer elements 98 responsible for the return of the friction shoe 96 are elastically deformed. The clamping and emergency braking arrangement is firmly engaged, by friction, with the guide track 1.

The various clamping states of the two different wedge drives may be monitored by sensors or a sensor system.

The clamping and emergency braking arrangement may also have individual slide wedge drive operated locking structures with electrical, pneumatic or hydraulic tensioning drives.

In FIGS. 10 to 20, the spring element 52 actuating the friction clamping structure 90 is not pre-tensioned by an electric drive 60 but by a magnet and lever drive actuated operating structure 170.

The operating structure 170 shown in FIG. 21 is a multi-clamp locking structure. It comprises an advance lock 180 and a retaining lock 190. Both are arranged in a housing or a support structure 100. In the support structure 110, a clamping rod 171 supported in the support structure bores is used as locking member. On the clamping rod 171 as locking structure an advance locking element 181 and a retaining element 191 are disposed. Both parts are plate components, which each are provided with bores (182, 192) whose diameter is slightly larger than that of the clamping rod 171. Both clamping elements 181, 191 are supported on the support structure 110 by spring elements 184, 194. The spring elements 184, 194 are disposed in the advancing direction 3 ahead of the clamping elements 181, 191. Below the advance locking element 181, a lever 166 is shown which abuts the clamping element eccentrically. If the lever 166 is moved in the direction of the arrow 178, it presses against the advance locking element 181 and moves the clamping rod 171 with the clamping element engaged therewith into their advance direction 3. The clamping rod 171 then moves through the bore 192 of the locking element 191, which, to this end, is pivoted slightly in the direction of the arrow 177 so as to unlock its engagement with the locking element 191. At the end of the advancing stroke, the spring element 194 presses the locking element 191 again into its clamping position. With the lever 166 now being moved in a direction opposite to that indicated by the arrow 178, the advance locking element 181 slides back on the clamping rod 171 following the lever 166 under the force of the spring 184. At the end of the pivot movement of the lever 166, the advance locking element is again in clamping engagement with the clamping rod 171 and a new advancing stroke can be initiated.

The bores 182, 192 and the clamping rod 171 do not need to have a circular cross-section. Other cross-sections are possible.

Figure 10:
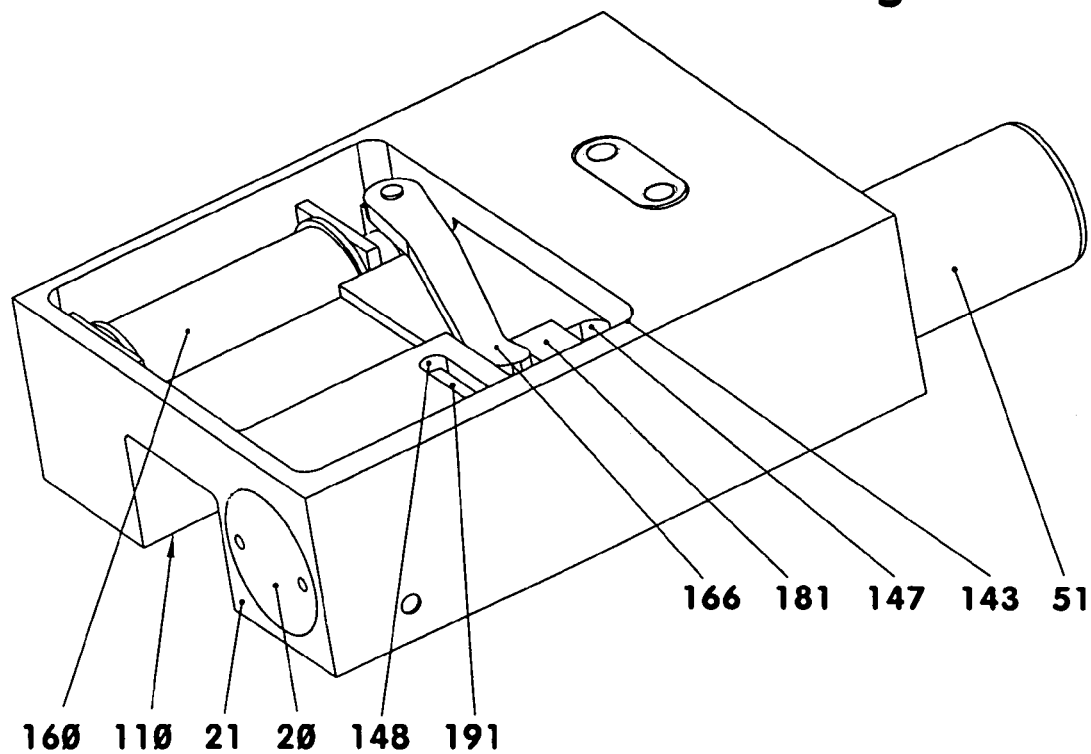
FIG. 10 is a perspective view of a mounted clamping and/or emergency braking structure with a clamping locking arrangement.
Figure 11:
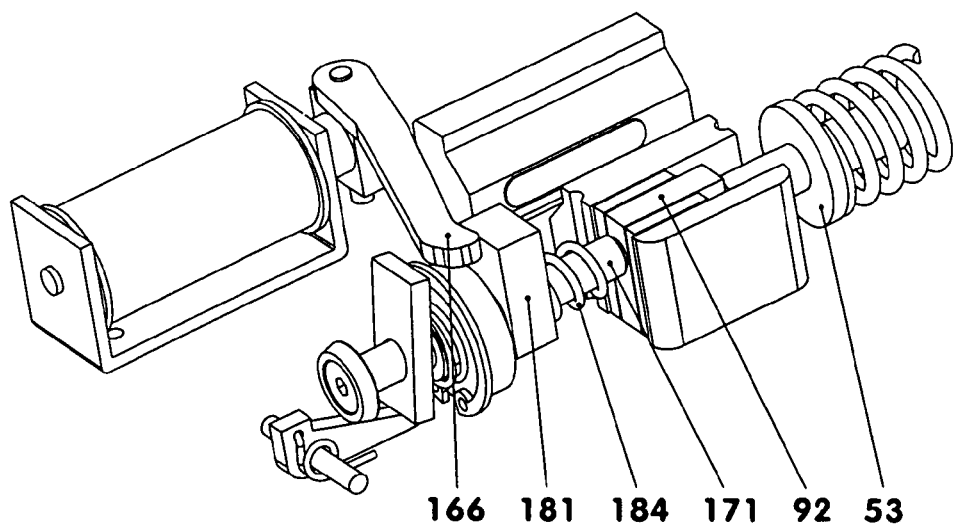
FIG. 11 shows the arrangement of FIG. 10 without the housing and with the spring not pre-tensioned.

This principle is utilized in the embodiments shown in FIGS. 10 to 20. FIG. 10 shows arranged in a housing 110 an operating magnet 160, which transmits its stroke by way of a lever 166 to the advance locking element 181. As shown in FIG. 11, the advance locking element 181 moves the clamping rod 171 in opposition to the force of the coil spring 184 toward the slide wedge 92 and the spring loaded piston 53.

The operating magnet 160 is supported in the housing 110 in a cavity 143. The cavity 143 comprises two hollow spaces 144 and 145 which are provided at opposite sides of the circumferential groove 14 and are joined above the circumferential groove 14 (see FIG. 15). Adjacent the cylindrical hollow space 145 toward the end face 21, there is a clamping arrangement space 116 closed by a cover 20. The space 116 is separated from the space 145 by a separating disc 131 secured in place by a retaining ring 134. The separating disc 131 includes a central bore 132 in which the clamping rod 171 is guided for example by a guide sleeve 133. This hollow space 145 is in communication with a cavity 143 by way of an elongated opening 147 of approximately rectangular cross-section, see FIG. 10. The elongated opening 147 provides for longitudinal guidance of the advance locking element 181. A comparable elongated opening 148 is disposed above the clamping arrangement space 116. There the upper area of the locking element 191 is supported with a large amount of play.

Opposite the friction clamping arrangement 90, the hollow space 145 is separated by an intermediate wall 111. The intermediate wall 111 includes a bore 132 which is in alignment with the bore 112. The clamping rod 171 is also guided in this bore 112. Between the intermediate wall 111 and the advance locking element 181, the spring element 184 is disposed on the clamping rod 171.

Figures 15, 16:
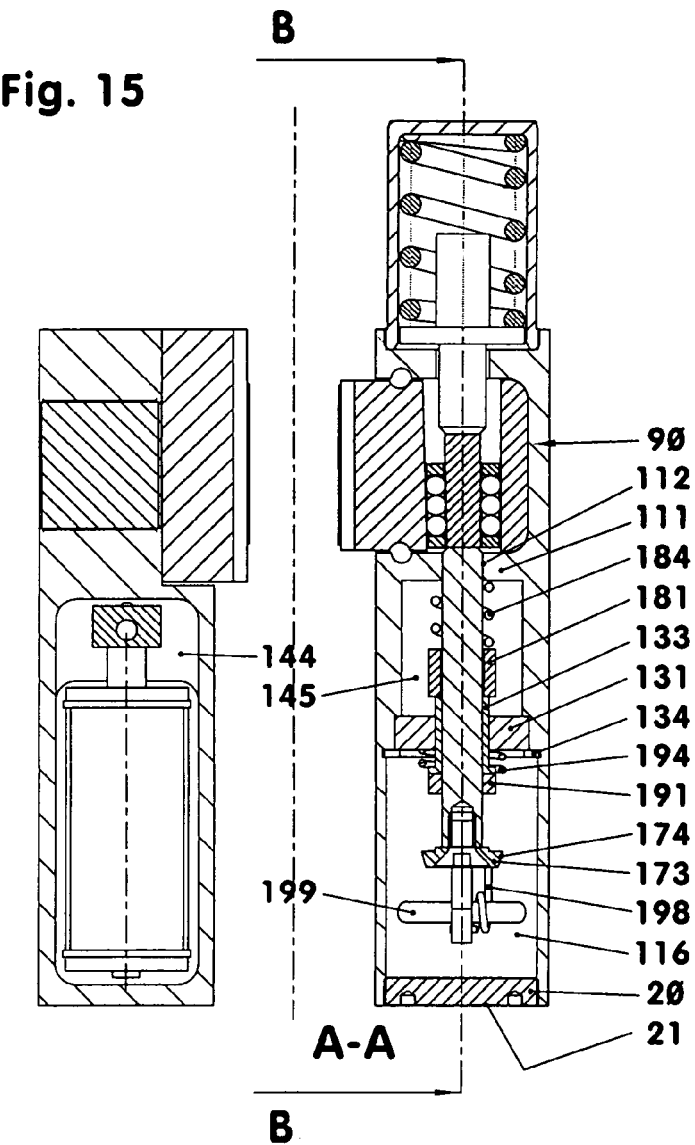
FIG. 15 is a longitudinal cross-sectional of FIG. 13 along a plane A—A of FIG. 17 extending through the clamping structure.
FIG. 16 is a sectional view taken along line B—B of FIG. 15.
Figure 17:
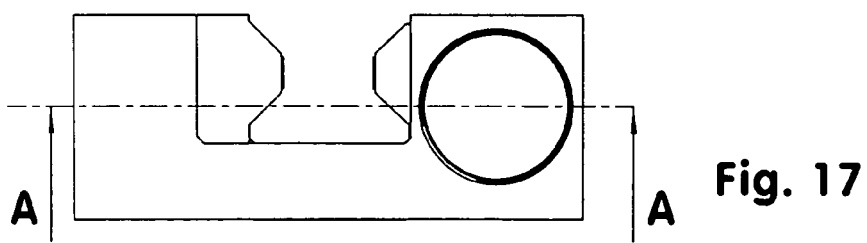
FIG. 17 is a front view of the structure shown in FIG. 10.

The advance locking element 181 is for example a rectangular plate with a bore 182 arranged eccentrically, see FIG. 16. In the upper area of its surface 185 facing the separating disc 131, there is the lever 166 having a lever end 168, see FIG. 13. At the same time, the lever 166 engages with its knee 167, a housing section 117 disposed above the locking disc 131. The lever 166 is pivotally supported in the hollow space 144 on the magnet armature 161. At the front side of the magnet armature 161, a transverse member 162 is arranged which extends transverse to the armature center line and carries in each of two bores a bolt 163, 164. The lever 166 is supported on the upper bolt, that is, the pivot bolt 164. The lower bolt, that is, the guide bolt 163 extends into a longitudinal groove 146 arranged in the bottom of the recess 144, see FIGS. 14, 20.

The operating magnet 160 provides for example a stroke of 6 mm, see FIGS. 11 and 12 and 13 and 20. Because of the lever transmission ratio of, for example, 15/1 a stroke of 0.4 mm is generated at the advance locking element 181 forward from the inner housing wall section 117.

With each stroke the spring element 52 is more pre-tensioned and the slide wedge drive or, respectively, the friction clamping structure is correspondingly released.

At the rear end of the clamping rod 171, there is, for example, in the cylindrical hollow space 116, a stop plate 173 in the form of a rotatable component with a conically or spherically curved surface 174. As shown in FIGS. 11 and 16, a wedge lever 195 engages the component 174. The wedge lever 195 is pivotally supported in the housing 110 by a wedge lever bearing bolt 199. The bolt 199 extends through the wedge lever 195 at the wider rear end area thereof. The bolt 199 carries a spiral spring 198 which is pre-tensioned so as to pivot the wedge lever 195 with its pointed area toward the clamping rod 171. The wedge lever 195 consequently abuts with its edge area 196 the stop plate 173. The edge area 196 may have any desired curvature for adaptation to the locking and release purposes in time with the contour of the stop plate 173.

Figures 18, 19:
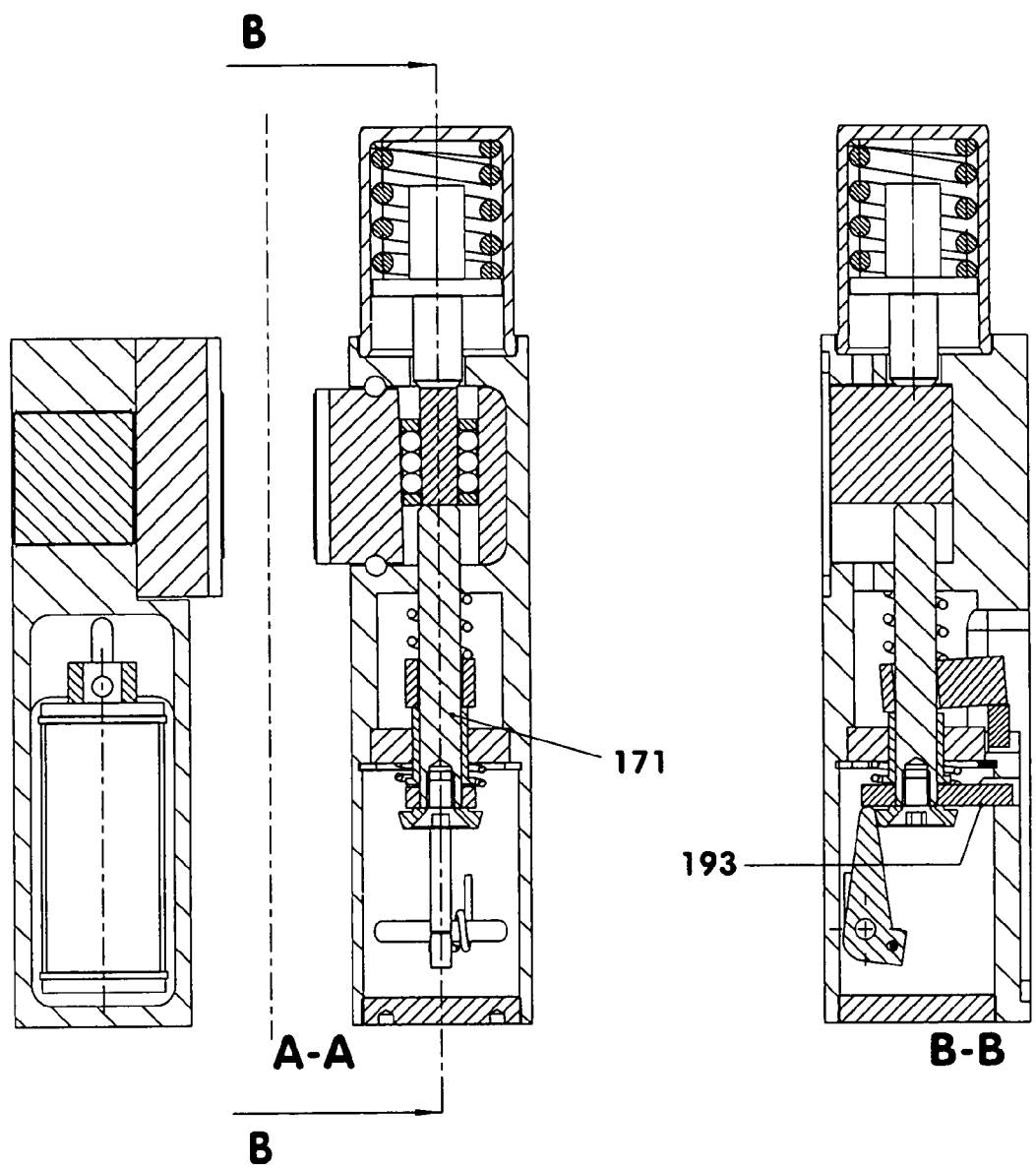
FIG. 18 shows the arrangement of FIG. 15 with the spring element tensioned.
FIG. 19 shows the arrangement of FIG. 16 with the spring element tensioned.

During pre-tensioning of the spring element 52, the stop plate 173 slides along the wedge lever 195 toward the locking element 191. The wedge tip 197 pivots upwardly as shown in FIG. 11. During pre-tensioning, as soon as the tip 197 slides onto the rear surface 193 of the locking element 191, the electromagnet 160 remains energized in the position as shown in FIGS. 12, 18 and 19. The pre-tensioning procedure is terminated herewith. Then the advance locking element 181 clamped to the clamping rod 171 keeps the spring element 52 under pre-tension. The locking element 191 is at the same time pivoted to such an extent that the bore 192 thereof, see FIG. 21, is disposed essentially concentrically with the surface of the clamping rod 171. Then the locking element 191 no longer has any clamping effects.

During a power outage for example, the operating magnet 160 is de-energized. The lever 166 pivots into the position as shown in FIG. 12. The advance locking element 181 then pivots to a vertical position whereby the clamping engagement thereof with the rod 171 is released. With the backside engagement of the wedge lever 195 with the locking element 191, there is also no clamping force effective in the locking structure 190. As a result, the clamping rod 171, the slide wedge 92 and the spring piston 53 move suddenly in the actuating direction of the spring 52.

During the movement of these parts, the wedge lever 195—displaced from the stop plate 173—slides with its tip 197 along the surface 193. As long as it abuts this surface 193, the locking element 191 cannot generate its clamping action. Shortly before reaching the maximum clamping stroke of the slide wedge 92, the tip 197 slides off the surface 193. The locking element 191 then pivots into clamping position. Up to the clamping of the locking engagement element 191 with the clamping rod 171, the clamping rod can move only a few tenths of a millimeter.

For releasing the tip 197 from the locking element 191, a small operating magnet may be arranged for example in the hollow space 116, which for example ahead of a new tensioning of the spring element 52 pivots the wedge lever 195—by a short impulse—into the position as shown in FIG. 16.

What is claimed is:

1. A friction brake arrangement with emergency braking function for use with a carriage guided by a guide track, said arrangement comprising at least one friction clamping structure having a housing with a friction shoe supported in said housing so as to be disposed adjacent said guide track and a spring element biasing said friction shoe toward said guide track for frictional engagement therewith, and power operated drive means for disengaging the friction shoe from the guide track and compressing the spring element, a blocking member disposed between the power operated drive means and the spring element so as to form a locking structure and electromagnetic means for holding the spring element in a compressed state.

2. A friction brake arrangement according to claim 1, wherein the locking structure is part of a slide wedge drive including a slide wedge element actuated by the spring element for biasing the friction shoe into engagement with the guide track and an electric drive means connected to the slide wedge element for moving the slide wedge element out of engagement with the guide track and holding it in a locking cavity of the housing.

3. A friction brake arrangement according to claim 1, wherein the power operated drive means for disengaging the friction shoe from the guide track and the electromagnetic means for holding the spring element is, in each case, one of an electromagnet and an electric motor.

4. A friction brake arrangement according to claim 1, wherein the locking structure is a form-locking retaining means.

5. A friction brake arrangement according to claim 1, wherein the blocking member comprises a blocking ball.

6. A friction brake arrangement according to claim 2, wherein the slide wedge element comprises a blocking bolt having a front area with an inclined wedge surface disposed adjacent the blocking member.

7. A friction brake arrangement according to claim 6, wherein the inclined blocking wedge surface has an angle of 20 to 40° with respect to the center line of the blocking bolt.

8. A friction brake arrangement according to claim 1, wherein the locking structure is arranged between the drive means and the friction clamping structure.

9. A friction brake arrangement according to claim 1, wherein the drive means comprises an operating magnet an angled lever drive and a magnet and lever drive actuated operating structure.

* * * * *